United States Patent
Tanaka et al.

(10) Patent No.: US 9,076,035 B2
(45) Date of Patent: Jul. 7, 2015

(54) IMAGE PROCESSOR, IMAGE PROCESSING METHOD, CONTROL PROGRAM, AND RECORDING MEDIUM

(71) Applicant: OMRON Corporation, Kyoto (JP)

(72) Inventors: Kiyoaki Tanaka, Kizugawa (JP); Takayoshi Yamashita, Kizugawa (JP)

(73) Assignee: OMRON Corporation, Kyoto-shi (JP)

( * ) Notice: Subject to any disclaimer, the term of this patent is extended or adjusted under 35 U.S.C. 154(b) by 104 days.

(21) Appl. No.: 13/724,432

(22) Filed: Dec. 21, 2012

(65) Prior Publication Data

US 2013/0243327 A1 Sep. 19, 2013

(30) Foreign Application Priority Data

Mar. 14, 2012 (JP) ................. 2012-058000

(51) Int. Cl.
- *G06K 9/62* (2006.01)
- *G06K 9/00* (2006.01)
- *G06K 9/32* (2006.01)

(52) U.S. Cl.
CPC .......... *G06K 9/00523* (2013.01); *G06K 9/6254* (2013.01); *G06K 9/3241* (2013.01); *G06K 9/6257* (2013.01)

(58) Field of Classification Search
None
See application file for complete search history.

(56) References Cited

U.S. PATENT DOCUMENTS

| | | | |
|---|---|---|---|
| 7,020,337 B2 | 3/2006 | Viola et al. | |
| 7,903,870 B1* | 3/2011 | Budagavi | 382/162 |
| 2002/0102024 A1* | 8/2002 | Jones et al. | 382/225 |
| 2009/0304290 A1* | 12/2009 | Fukaya et al. | 382/224 |
| 2011/0299783 A1* | 12/2011 | Chotard et al. | 382/195 |

FOREIGN PATENT DOCUMENTS

| | | |
|---|---|---|
| EP | 1 973 060 A2 | 9/2008 |
| EP | 2 133 823 A2 | 12/2009 |
| GB | 2343945 A | 5/2000 |
| JP | 2000-163600 A | 6/2000 |
| JP | 2003-111063 A | 4/2003 |
| JP | 2010-096962 A | 4/2010 |
| JP | 2010-238181 A | 10/2010 |
| JP | 2010-277242 A | 12/2010 |
| JP | 2011-124819 A | 6/2011 |

OTHER PUBLICATIONS

Viola et al. "Rapid Object Detection Using a Boosted Cascade of Simple Features." Proceedings of the 2001 IEEE Computer Society Conference on Computer Vision and Pattern Recognition, vol. 1, 2001, pp. 511-518.*

(Continued)

*Primary Examiner* — Jon Chang

(74) *Attorney, Agent, or Firm* — Nutter McClennen & Fish LLP; John J. Penny, Jr.

(57) ABSTRACT

A registration image including a desired target can easily be registered. A domain near an assigned position assigned by a user on a photographed image is extracted from the photographed image to generate a search image, a classifier performs the processing to the generated search image, and a processing domain having the largest number of hierarchies to which a weak classifier can perform the processing is extracted from the photographed image to generate the registration image.

8 Claims, 12 Drawing Sheets

(56) References Cited

OTHER PUBLICATIONS

Huang et al. "Boosting Nested Cascade Detector for Multi-view Face Detection." Proceedings of the 17th International Conference on Pattern Recognition, vol. 2, Aug. 2004, pp. 415-418.*

Korean Office Action for Application No. 10-2012-0154689 issued Feb. 26, 2014.
Extended European Search Report for Application No. 12197309.3 issued Aug. 28, 2014 (10 pages).

* cited by examiner

IMAGE PROCESSOR, IMAGE PROCESSING METHOD, CONTROL PROGRAM, AND RECORDING MEDIUM

BACKGROUND OF THE INVENTION

1. Technical Field

The present invention relates to an image processor that detects targets such as a human and a pet from an image, an image processing method, a control program, and a recording medium.

2. Related Art

In recent years a technology in which, during photographing, a human face and the like are detected to focus a digital camera on a detected target or to adjust a white balance of the detected target is mounted on image processors such as the digital camera. In the technology, it is desired that targets such as the human face can correctly be detected from the image. Therefore, various technologies of detecting a predetermined target have been developed.

For example, in a technology disclosed in Japanese Unexamined Patent Publication No. 2011-124819, a face pattern having a high matching degree with a registration pet image is extracted by referring to dictionary data, and processing of recognizing the registration pet image is performed based on the extracted face pattern.

In a technology disclosed in Japanese Unexamined Patent Publication No. 2010-277242, in order to accurately detect a front face at a high speed, a first-stage classifier is performed to detect a face image, and a second-stage classifier is performed to a position where the face image is detected and a neighborhood of the position to detect the front face.

In a technology disclosed in Japanese Unexamined Patent Publication No. 2010-238181, face images of a registrant viewed from various directions are registered, and the registrant is authenticated based on the registered data.

In a technology disclosed in Japanese Unexamined Patent Publication No. 2010-96962, a user sets an AF frame, and a range of the AF frame is changed so as to fit in the position and size of the face image included in the AF frame.

It is assumed here that the image processor performs face detection processing of detecting a "face" from an image using a face detector that detects a common human face, a pet face and the like. In many cases, the face detector can detect the human face and the pet face, which are included in the photographed image. However, sometimes the face detector cannot detect some of the human faces and the pet faces. In this case, with the conventional image processor, the user is caused to register the image including the target that cannot be detected by the face detector, and the desired target is detected based on the registration image, thereby solving the problem.

Thus, the target that cannot be detected by the face detector can be detected by performing the detection processing based on the registration image. Here, in order to detect the desired target based on the registration image, it is necessary that the whole desired target be included in the registration image. However, when registering the image, sometimes the user cannot assign a domain including the whole desired target.

For example, in the case where the desired target is a dog or a cat, sometimes the domain including the whole face of the dog or the cat cannot be assigned because the domain (a boundary) of the "face" is unclear compared with the human face. Even if the user exactly understands the domain including the target, the user mistakenly assigns another domain, and sometimes the whole desired target is not included in the assigned domain.

On the other hand, in order to cause the user to assign the domain including the whole desired target, it is conceivable that the number of input points used to specify the domain is increased (for example, the assignment of the positions of organs such as an eye, a nose, and a mouth). However, in the method, the user manipulation is complicated and degrades operability.

Therefore, similarly to the conventional method, the domain is desirably assigned based on the one or two input points to generate the registration image.

The present invention has been devised to solve the problems described above, and an object thereof is to construct an image processor that can easily register the registration image including the desired target, an image processing method, a control program, and a recording medium.

SUMMARY

In accordance with one aspect of the present invention, an image processor includes: a classifier configured to detect a predetermined target from an image, the classifier including one or a plurality of weak classifiers in which a next-stage weak classifier is configured to perform detection processing to a preceding-stage output domain; an image acquisition part configured to acquire a photographed image photographed by a camera; an assigned position specifying part configured to specify a position assigned by a user on the photographed image; a search image generator configured to extract a domain near a position assigned by the assigned position specifying part from the photographed image and generate a search image; a classifier performing part configured to cause the classifier to perform detection processing to the search image generated by the search image generator; a processing domain specifying part configured to, based on a detection result, specify a processing domain having the largest number of hierarchies to which the weak classifier or each of the plurality of weak classifiers can perform the processing; and a registration image generator configured to extract the processing domain specified by the processing domain specifying part from the photographed image and generate a registration image.

In accordance with another aspect of the present invention, an image processing method for an image processor including a classifier configured to detect a predetermined target from an image, the classifier including one or a plurality of weak classifiers in which a next-stage weak classifier is configured to perform detection processing to a preceding-stage output domain, the image processing method includes the steps of: acquiring a photographed image photographed by a camera; specifying a position assigned by a user on the photographed image; extracting a domain near a position assigned in the assigned position specifying step from the photographed image and generating a search image; causing the classifier to perform detection processing to the search image generated in the search image generating step; specifying a processing domain having the largest number of hierarchies to which the weak classifier or each of the plurality of weak classifiers can perform the processing based on a detection result in the classifier performing step; and extracting the processing domain specified in the processing domain specifying step from the photographed image and generating a registration image.

At this point, because the image processor and the image processing method are intended to generate the registration image, it is assumed that the detection target cannot be detected when the classifier performs the processing to the photographed image. That is, the output domain outputted from the final-stage weak classifier of the classifier does not exist when the classifier performs processing to the photographed image.

According to the above configuration, the search image generator is configured to extract the domain near the position assigned by the user from the photographed image and generate the search image. The processing domain specifying part is configured to specify the processing domain having the largest number of hierarchies to which the weak classifier or each of the plurality of weak classifiers can perform the processing in the search image, namely, the domain having the highest prospect of including the detection target of the classifier in the search image, and the registration image generator extracts the domain specified by the processing domain specifying part from the photographed image and generates the registration image.

Therefore, advantageously the registration image including the target desired by the user can be generated even if the position assigned by the user is slightly deviated.

In the image processor, it is preferable that the search image generator is configured to specify a domain assigned by the user on the photographed image based on the position assigned by the assigned position specifying part, and the search image generator is configured to extract a domain larger than the specified domain from the photographed image and generate the search image.

In the image processor, it is preferable that the search image generator is configured to specify a plurality of domains having different sizes, the position assigned by the assigned position specifying part being located in the center in the plurality of domains, and the search image generator being configured to extract each of the plurality of domains specified by the search image generator, from the photographed image and generate a plurality of search images.

In the image processor, it is preferable, for a plurality of processing domains having the largest number of hierarchies to which the weak classifier or each of the plurality of weak classifiers can perform the processing, the processing domain specifying part is configured to specify the processing domain having the highest index indicating superiority or inferiority of the detection result.

In the image processor, it is preferable, for a plurality of processing domains having the largest number of hierarchies to which the weak classifier or each of the weak classifiers can perform the processing, the processing domain specifying part is configured to specify a domain in which the plurality of processing domains are integrated.

In the image processor, it is preferable that the registration image generator may be configured to not perform registration image generating processing based on the processing domain specified by the processing domain specifying part when the number of hierarchies of the processing domains specified by the processing domain specifying part is less than or equal to a predetermined value.

In accordance with still another aspect of the present invention, an image processor includes: an image acquisition part configured to acquires a photographed image photographed by a camera; an assigned position specifying part configured to specify a position assigned by a user on the photographed image; a search image generator configured to extract a domain near a position assigned by the assigned position specifying part from the photographed image and generate a search image; a contour detector configured to detect a contour of a predetermined target from the search image generated by the search image generator; and a registration image generator configured to extract a domain closed by the contour detected by the contour detector from the photographed image and generate a registration image.

In accordance with yet another aspect of the present invention, an image processing method includes the steps of: acquiring a photographed image photographed by a camera; specifying a position assigned by a user on the photographed image; extracting a domain near a position assigned in the assigned position specifying step from the photographed image and generating a search image; detecting a contour of a predetermined target from the search image generated by the search image generating step; and extracting a domain closed by the contour detected in the contour detecting step from the photographed image and generating a registration image.

According to the above configuration, the search image generator may be configured to extract the domain near the position assigned by the user from the photographed image and generate the search image. The contour detector may be configured to detect the contour of the predetermined target from the search image, and the registration image generator may be configured to extract the domain, which is closed by the contour detected by the contour detector, from the photographed image to generate the registration image.

Therefore, advantageously the registration image including the target desired by the user can be generated even if the position assigned by the user is slightly deviated.

The image processor may be constructed by a computer. In this case, the present invention also includes a control program that constructs the image processor by the computer by causing the computer to act as each part of the image processor and a computer-readable recording medium in which the control program is recorded.

As described above, the image processor includes: the image acquisition part configured to acquire the photographed image photographed by the camera; the assigned position specifying part configured to specify the position assigned by the user on the photographed image; the search image generator configured to extract the domain near the position assigned by the assigned position specifying part from the photographed image and generate the search image; the classifier performing part configured to cause the classifier to perform the detection processing to the search image generated by the search image generator; the processing domain specifying part configured to specify the processing domain having the largest number of hierarchies to which the weak classifier or each of the plurality of weak classifiers can perform the processing based on a detection result; and the registration image generator configured to extract the processing domain specified by the processing domain specifying part from the photographed image and generate the registration image.

The image processing method includes the steps of: acquiring the photographed image photographed by the camera; specifying the position assigned by the user on the photographed image; extracting the domain near the position assigned in the assigned position specifying step from the photographed image and generating the search image; causing the classifier to perform detection processing to the search image generated in the search image generating step; specifying the processing domain having the largest number of hierarchies to which the weak classifier or each of the plurality of weak classifiers perform the processing based on the detection result in the classifier performing step; and extracting the processing domain specified in the processing domain specifying step from the photographed image and generating a registration image.

Therefore, advantageously the registration image including the target desired by the user can be generated even if the position assigned by the user is slightly deviated.

The image processor includes: the image acquisition part configured to acquire the photographed image photographed by the camera; the assigned position specifying part configured to specify the position assigned by the user on the photographed image; the search image generator configured to extract the domain near the position assigned by the assigned position specifying part from the photographed image and to generate the search image; the contour detector configured to detect the contour of the predetermined target from the search image generated by the search image generator; and the registration image generator configured to extract the domain closed by the contour detected by the contour detector from the photographed image and generate the registration image.

The image processing method includes the steps of: acquiring the photographed image photographed by the camera; specifying the position assigned by the user on the photographed image; extracting the domain near the position assigned in the assigned position specifying step from the photographed image and generating the search image; detecting the contour of the predetermined target from the search image generated by the search image generating step; and extracting the domain closed by the contour detected in the contour detecting step from the photographed image and generating the registration image.

Therefore, advantageously the registration image including the target desired by the user can be generated even if the position assigned by the user is slightly deviated.

DETAILED DESCRIPTION

Figure 1:
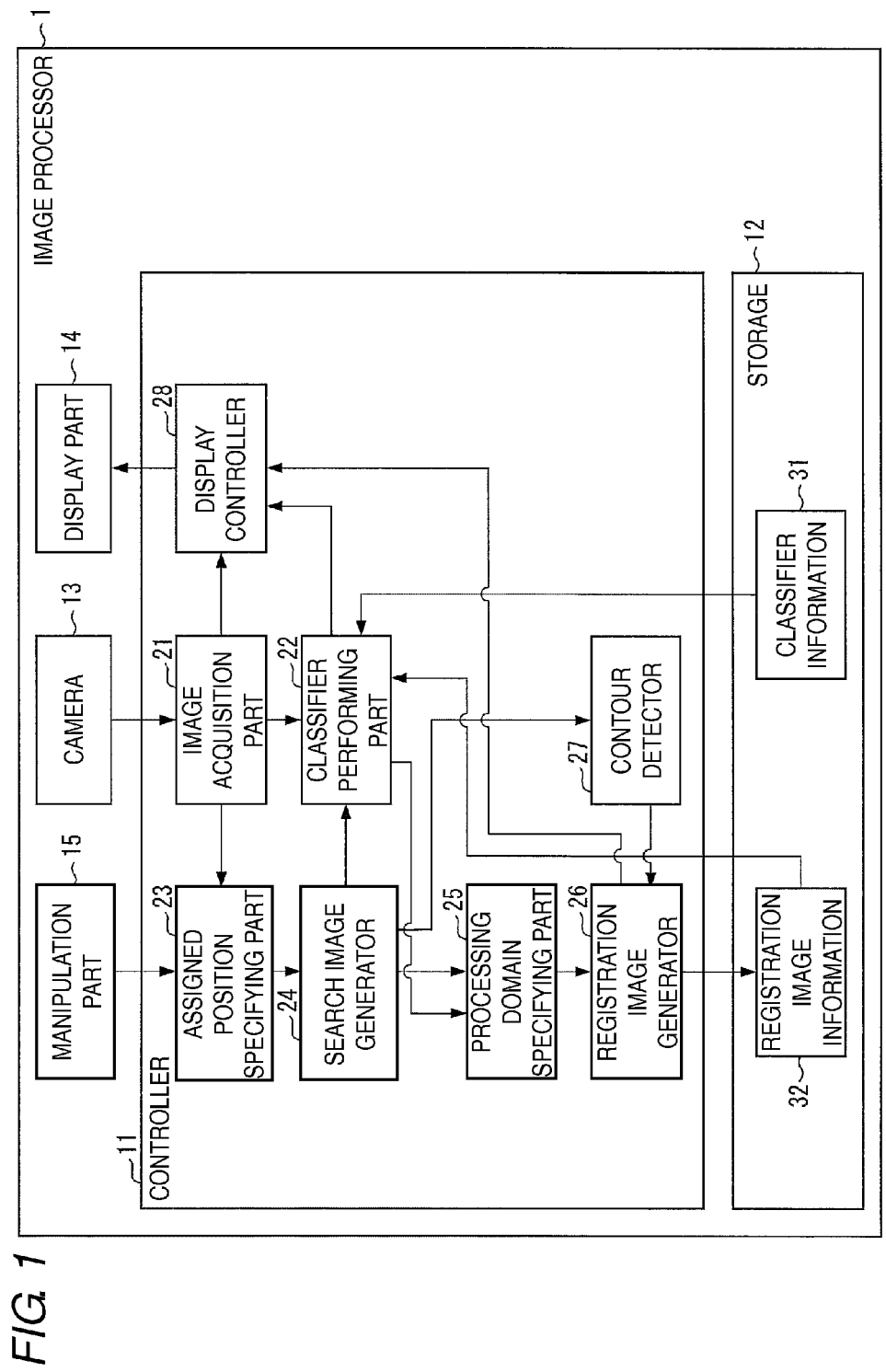
FIG. 1 is a block diagram illustrating an example of a main-portion configuration of an image processor according to an embodiment of the present invention.

Hereinafter, an embodiment of the present invention will be described with reference to FIGS. 1 to 16.

(Configuration of Image Processor)

An image processor according to an embodiment of the invention detects a predetermined target on an image. The target detected by the image processor is referred to as a detection target. As used herein, the detection target means any material object on the image, for example, an entire body, a face, an eye, a nose, a mouth, a hand, am arm, and a leg of a human, entire bodies and faces of animals, such as a dog, a cat, and a bird, entire vehicle bodies and tires of an automobile and a motor cycle, construction products, such as a building and a house, and natural objects such as a tree, a cloud, and the sun.

Any image processor may be used as long as the image processor detects the detection target on the image. Examples of the image processor include a digital camera, a digital video camera, a PC, a mobile phone, a PDA (Personal Digital Assistant), a game machine, a device that takes and prints a photograph, and a device that edits the image.

The image processor of the embodiment includes one or a plurality of classifiers that detect the detection target from the input image. The image inputted to the classifier is referred to as an input image.

The classifier includes one or a plurality of weak classifiers. The weak classifier constituting the classifier determines whether one or a plurality of feature quantities in a predetermined domain of the input image fall within predetermined reference domains, and the weak classifier outputs the domain where the feature quantity falls within the reference domain. In other words, the weak classifier determines whether the detection target is included in the predetermined domain of input image, and the weak classifier outputs the domain where the detection target is determined to be included. The weak classifier may extract any feature quantity from the domain. For example, a luminance value, edge information, frequency characteristics, such as Gabor and Haar, luminance-gradient feature quantity, such as SIFT and HOG, and a combination thereof may be used as the feature quantity.

A sequence to perform processing is set in the weak classifiers, the next-stage weak classifier performs detection processing to the predetermined domain in the output domain output from the preceding-stage weak classifier. The first-stage weak classifier performs the detection processing to (a whole domain of) the input image inputted to the classifier. The output domain output from the final-stage weak classifier is an output of the classifier. In the case where the preceding-stage weak classifier outputs no output domain, the subsequent weak classifiers do not perform the detection processing.

Hereinafter the detection processing sequence of the weak classifier is referred to as a hierarchy. For example, it is assumed that the weak classifier that performs the seventh stage or step of detection processing in the classifier is a weak classifier of hierarchy 7.

The detection processing of the classifier will specifically be described with reference to FIGS. 2 to 5. FIGS. 2 to 5 are views illustrating examples of the detection processing and detection results of the weak classifiers constituting the classifier. It is assumed that the classifier in FIGS. 2 to 5 includes 10 weak classifiers L1 to L10. It is also assumed that the classifier in FIGS. 2 to 5 is a dog classifier that detects a dog.

Figure 2:
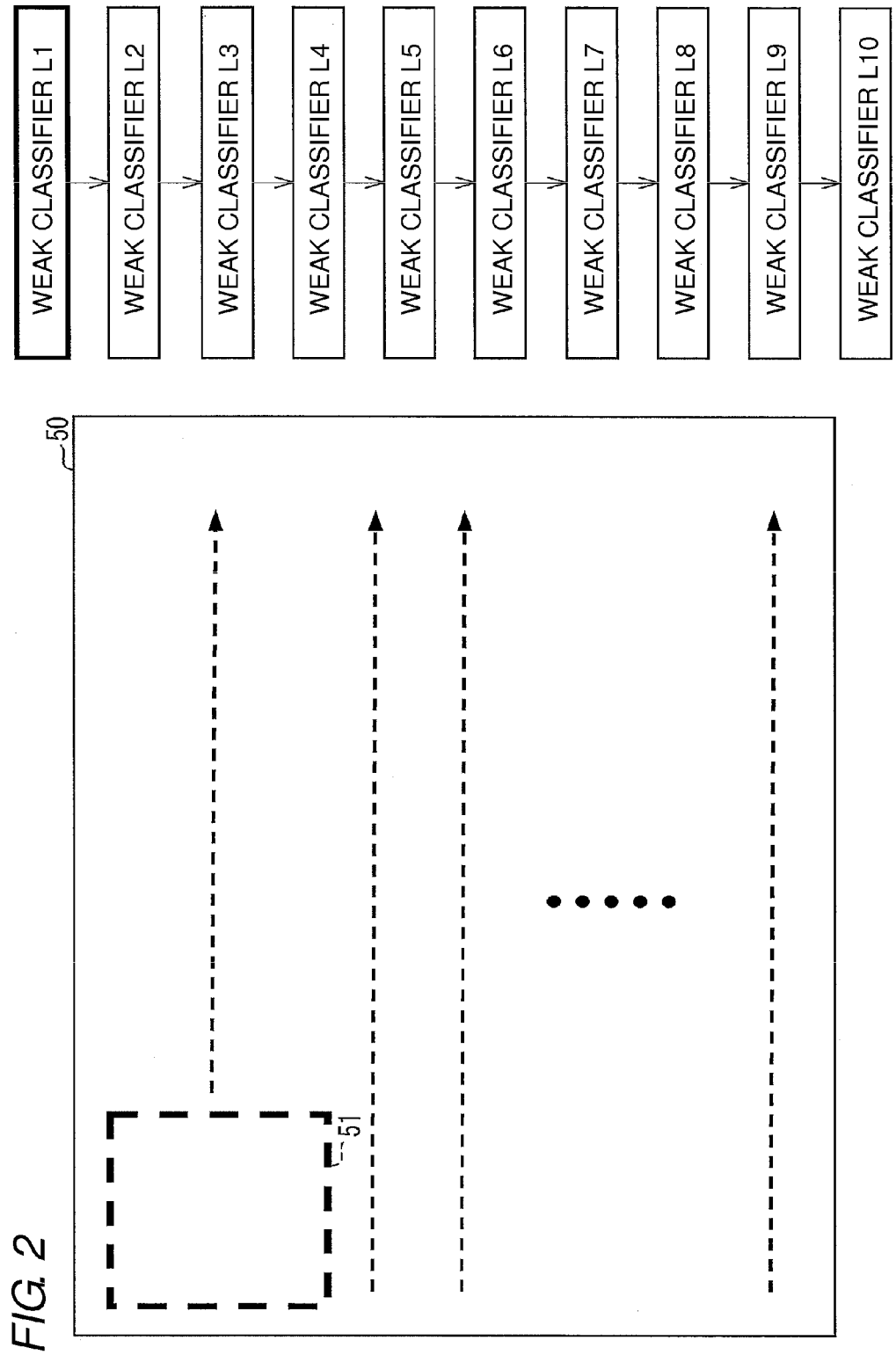
FIG. 2 is a view illustrating an example of detection processing and a detection result of a weak classifier constituting a classifier.

As illustrated in FIG. 2, the weak classifier L1 sets a domain 51 having a predetermined size and a predetermined shape in an input image 50 inputted to the classifier. The domain set by the weak classifier is referred to as a processing domain 51. The weak classifier L1 performs raster scan to the whole input image 50 using the processing domain 51, determines whether one or a plurality of feature quantities in each processing domain 51 falls within the predetermined reference domain, and outputs the processing domain 51 where the feature quantity falls within the predetermined reference domain as the output domain.

Figure 3:
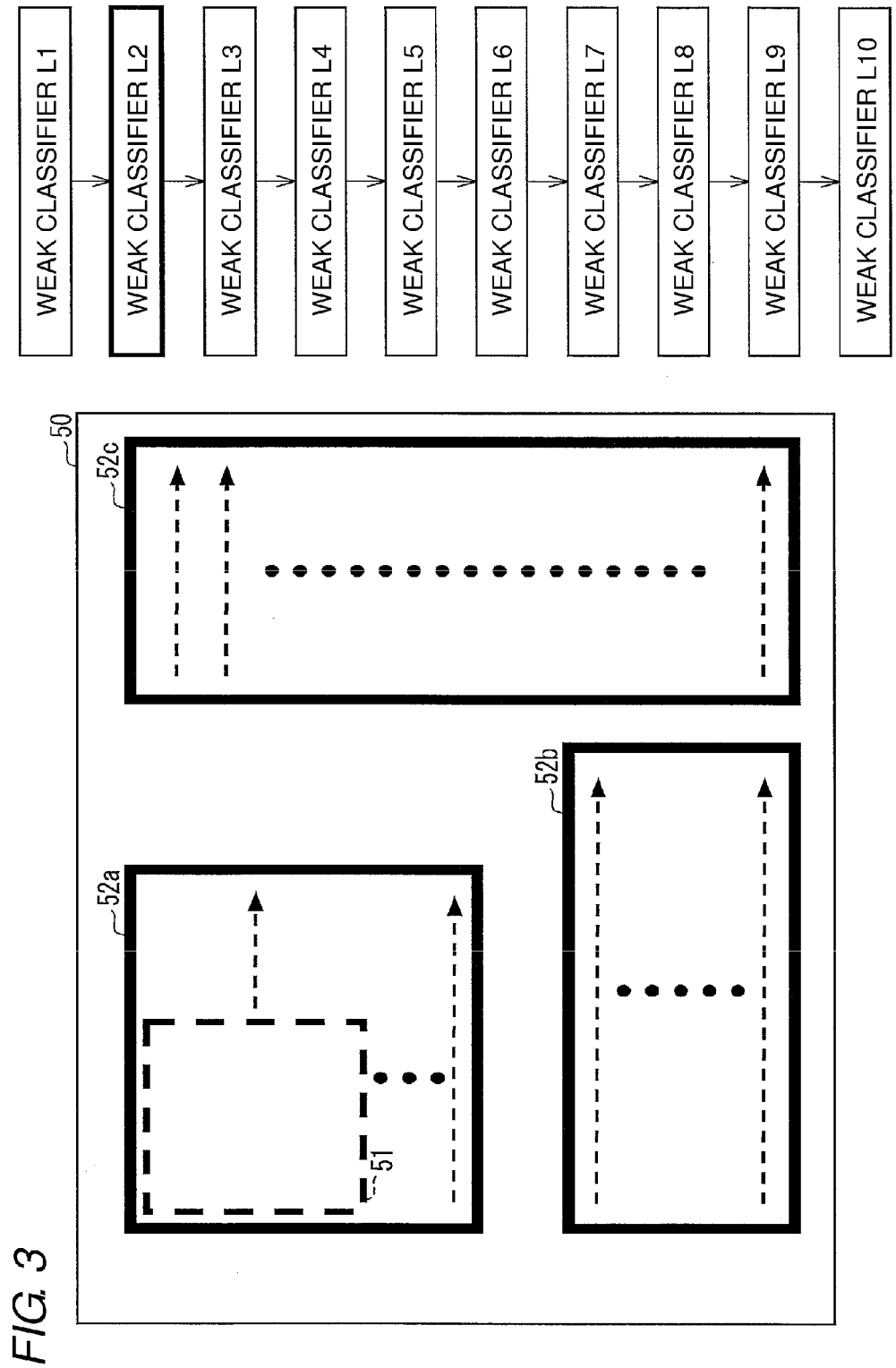
FIG. 3 is a view illustrating an example of detection processing and a detection result of a weak classifier constituting the classifier.

Here, as illustrated in FIG. 3, it is assumed that, as a result of the detection processing performed by the weak classifier L1, the weak classifier L1 outputs output domains 52a, 52b, and 52c as the output domain. In this state, the weak classifier L2 performs the detection processing by performing the raster scan to the output domains 52a, 52b, and 52c using the processing domain 51.

Figure 4:
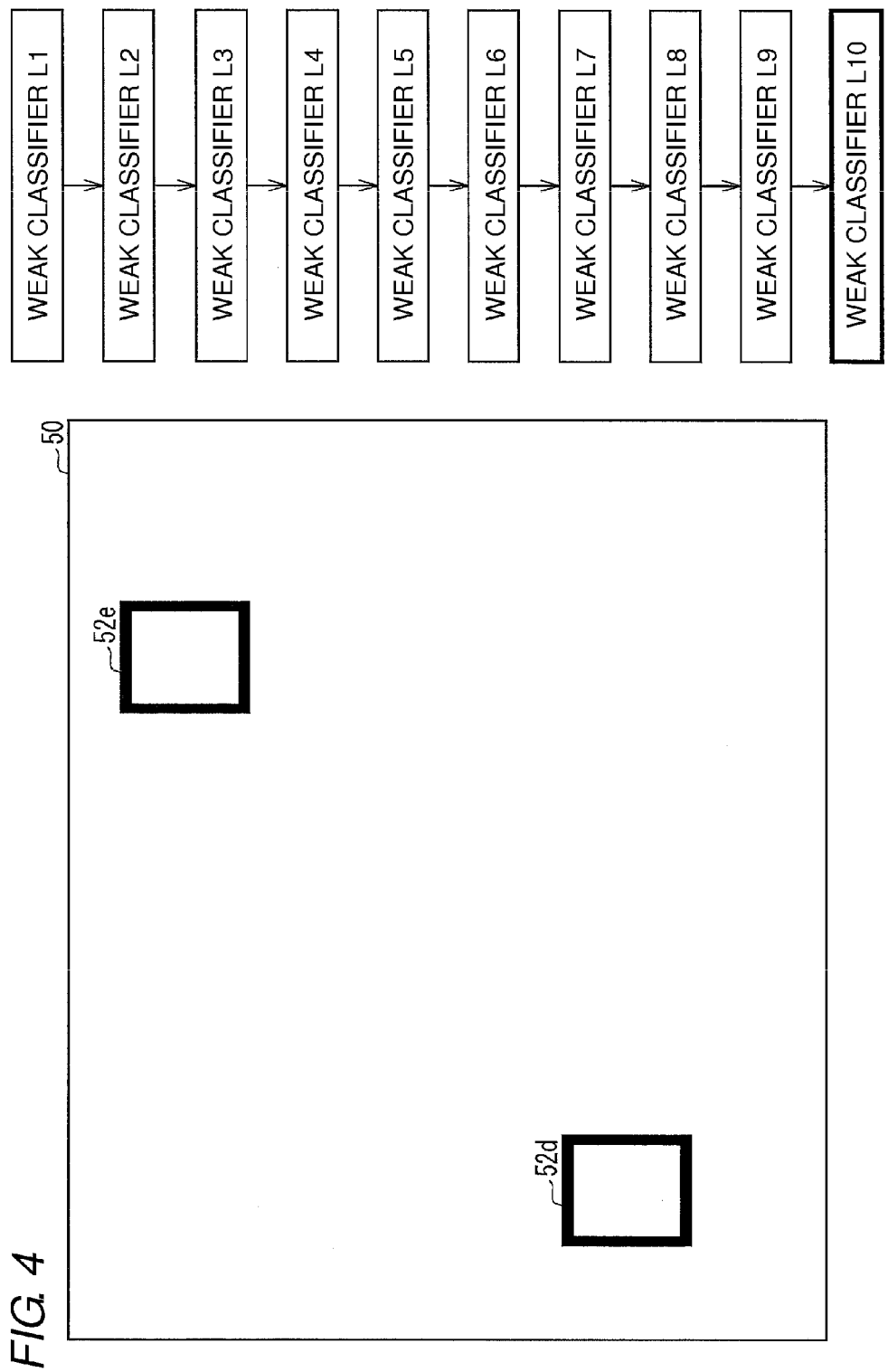
FIG. 4 is a view illustrating an example of detection processing and a detection result of a weak classifier constituting the classifier.

Then the weak classifiers L3 to L10 perform the detection processing, and the weak classifier L10 outputs output domains 52d and 52e as illustrated in FIG. 4. That is, the output domains 52d and 52e are obtained as the output when the dog classifier including the weak classifiers L1 to L10 performs the detection processing to the input image 50. A detection target of "dog" is included in the output domains 52d and 52e of the input image 50. At this time, the classifier may output an index indicating superiority or inferiority of the detection result of the output domain.

Figure 5:
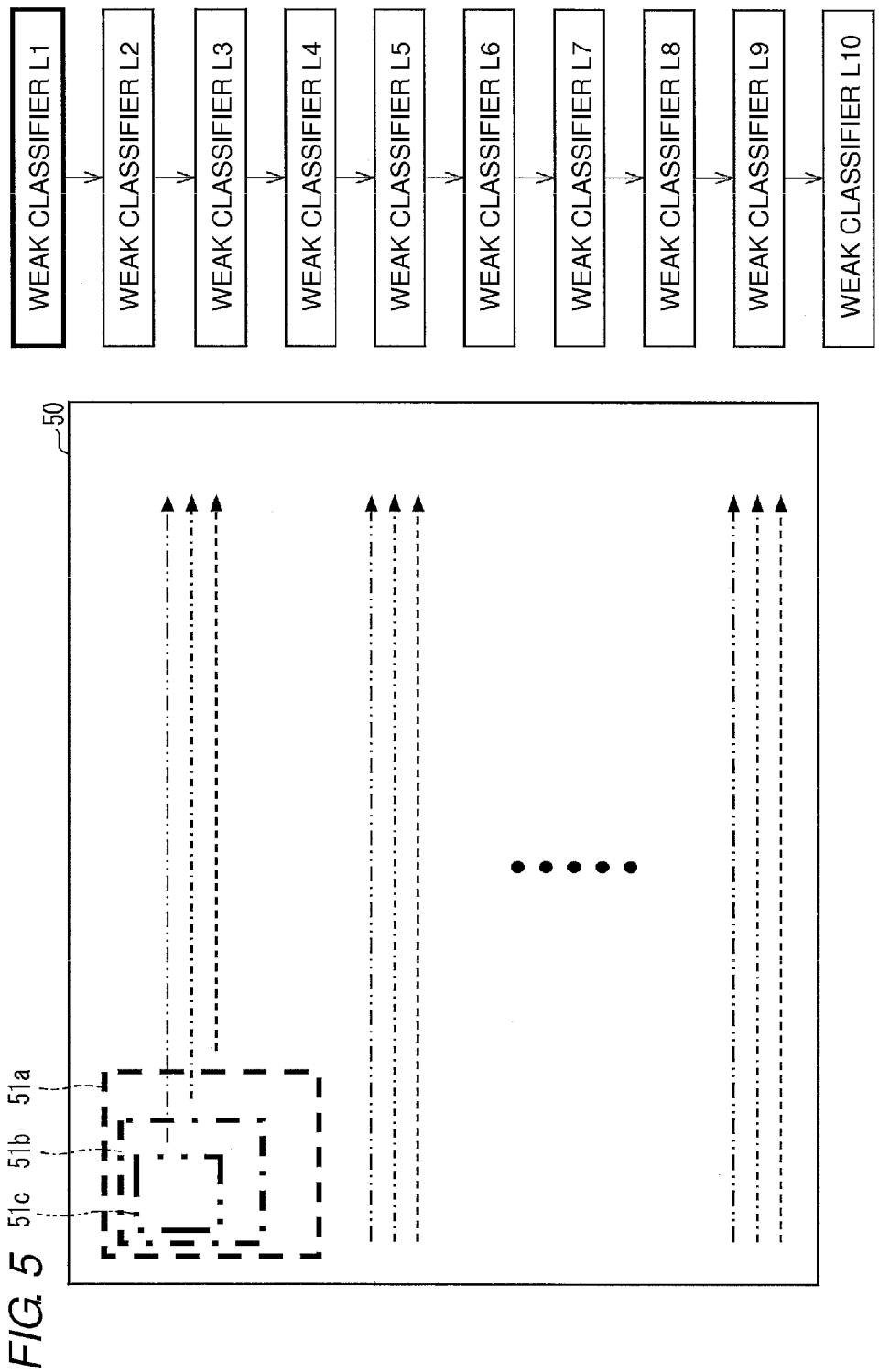
FIG. 5 is a view illustrating an example of detection processing and a detection result of the weak classifier constituting the classifier.

As illustrated in FIG. 5, the weak classifier may set processing domains 51a, 51b, and 51c having different sizes. The processing domain 51 has the rectangular shape in the example in FIGS. 2 to 5. However, the processing domain 51 is not limited to the rectangular shape. For example, the processing domain 51 may have a circular shape. The number of kinds of the processing domains set by the weak classifier may be set to any number, and the size and shape of the processing domain may arbitrarily be set. The set processing domain may vary in each weak classifier.

In the case where the detection result of the input image is "absence of the output domain", the classifier may output the number of hierarchies of the weak classifiers, each of which performs the detection processing, while correlating the processing domain.

At this time, the classifier may output an index indicating superiority or inferiority of the detection result of the processing domain in addition to the number of hierarchies. For example, the index may indicate certainty that the detection target is included in the processing domain.

That is, in the case where the detection target cannot be detected from the input image, the classifier may output the number of hierarchies to which the weak classifier or each of the plurality of weak classifiers can perform the detection processing and the index indicating the superiority or inferiority of the detection result of the processing domain in each processing domain of the input image.

A detector is a term having the same meaning as the classifier, and the classifier is also referred to as a cascade. The weak classifier is also referred to as a layer.

A configuration of the image processor will be described below with reference to FIG. 1. FIG. 1 is a block diagram illustrating an example of a main-portion configuration of an image processor 1. As illustrated in FIG. 1, the image processor 1 includes a controller 11, a storage 12, a camera 13, a display part 14, and a manipulation part 15. The image processor 1 may include parts, such as a communication part that conduct communication with another device, a sound input part, and a sound output part. However, the parts are not illustrated because the parts are not related to the feature of the present invention.

The camera 13 photographs the image. The image photographed by the camera 13 is referred to as a photographed image. The camera 13 is mounted in the embodiment. However, the invention is not limited to the embodiment. For example, the camera 13 and the image processor 1 may be separated from each other. An image providing device may be used instead of the camera 13. Any image providing device may be used as long as the image providing device provides a retained or acquired image to another device. Examples of the image providing device include a digital camera, a digital television set, a PC, a mobile phone, a PDA (Personal Digital Assistant), a game machine, and storage devices, such as a USB (Universal Serial Bus) memory.

The display part 14 displays the image according to an instruction of the controller 11. Any display part may be used as the display part 14 as long as the display part displays the image according to the instruction of the controller 11. For example, an LCD (Liquid Crystal Display), an organic EL display, and a plasma display may be applied to the display part 14.

The manipulation part 15 is used in order that a user inputs an instruction signal to the image processor 1 to manipulate the image processor 1. The manipulation part 15 may be constituted by input devices, such as a keyboard, a mouse, a keypad, and a manipulation button. A touch panel in which the manipulation part 15 and the display part 14 are integrally formed may be used. The manipulation part 15 may be remote-control devices, such as a remote controller, which are formed independently of the image processor 1.

The controller 11 performs various operations by executing a program read from the storage 12 onto a temporary storage (not illustrated), and the controller 11 wholly controls the parts included in the image processor 1.

In the embodiment, the controller 11 includes an image acquisition part 21, a classifier performing part 22, an assigned position specifying part 23, a search image generator 24, a processing domain specifying part 25, a registration image generator 26, a contour detector 27, and display controller 28 as functional blocks. The functional blocks (21 to 28) of the controller 11 are implemented such that a CPU (Central Processing Unit) reads the program, which is stored in a storage device constructed by a ROM (Read Only Memory), onto the temporary storage constructed by a RAM (Random Access Memory), and the CPU executes the program.

The image acquisition part 21 acquires the photographed image from the camera 13. The image acquisition part 21 outputs the acquired photographed image to the classifier performing part 22, the search image generator 24, and the display controller 28.

The classifier performing part 22 includes one or a plurality of classifiers, and inputs the photographed image acquired from the image acquisition part 21 as the input image to the classifier. The classifier performing part 22 causes the classifier to perform the detection processing. The classifier performing part 22 outputs the detection result of the classifier to the display controller 28.

When acquiring the search image from the search image generator 24, the classifier performing part 22 inputs the acquired search image as the input image to the classifier, and causes the classifier to perform the detection processing. The classifier performing part 22 outputs the detection result of the classifier to the processing domain specifying part 25 with respect to the search image.

The classifier performing part 22 may read classifier information from the storage 12, and change the detection target of the classifier or the feature quantity and the reference range, which are used by the weak classifier constituting the classifier during the detection.

In the case where the target included in a registration image is detected, the classifier performing part 22 reads registration image information from the storage 12, selects the optimum classifier in order to detect the target included in the registration image indicated by the registration image information, and causes the selected classifier to perform the detection to the input image. For example, the classifier performing part 22 may cause the classifier to perform to the registration image, and select the classifier having the highest index of the detection output domain outputted as the result.

The assigned position specifying part 23 specifies a position (hereinafter referred to as an assigned position), which is assigned by the user on the photographed image acquired from the image acquisition part 21, based on the user instruction inputted to the manipulation part 15. The assigned position specifying part 23 outputs the position, which is assigned by the user on the photographed image, to the search image generator 24.

Based on the position on the photographed image, which is acquired from the assigned position specifying part 23, the search image generator 24 extracts the domain near the assigned position from the photographed image to generate a search image. The search image generator 24 outputs the generated search image to the classifier performing part 22 and the contour detector 27.

Specifically, the search image generator 24 specifies a domain (hereinafter referred to as an assigned domain) on the photographed image, which is assigned by the user, based on the assigned position on the photographed image, which is acquired from the assigned position specifying part 23. The search image generator 24 specifies one predetermined domain (hereinafter referred to as a search domain) and extracts the specified search domain as a search image. The center of the search domain is located in the same position as the assigned domain, and the search domain has the size larger than (range wider than) that of the assigned domain.

For example, in the case where the user assigns two points on the photographed image, the search image generator 24 may set a rectangular domain, in which the assigned two points are located at diagonal points, to the assigned domain. For example, in the case where the user assigns one point on the photographed image, the search image generator 24 may set a rectangular or circular domain having a predetermined size, in which the assigned one point is a reference point (for example, the center), to the assigned domain. The search image generator 24 may specify the search domain having any shape (that is, the shape of the search image). For example, the search domain may have a rectangular or circular shape.

The search image generator 24 specifies a plurality of rectangular search domains having different sizes, and extracts the specified search domains as the search image. In each of the rectangular search domains, the assigned position on the photographed image, which is acquired from the assigned position specifying part 23, is set to the center. The search image generator 24 may specify the search domain having any shape (that is, the shape of the search image). For example, the search image generator 24 may specify a plurality of circular search domains having different radii. In each of the circular domains, the assigned position is set to the center.

As described above, it is necessary that the search domain (search image) have the size larger than that of the assigned domain. Here, the prospect that the whole target desired by the user is included increases with increasing size of the search domain. In other words, with increasing size of the search domain, accuracy of the assigned position desired by the user is reduced to improve operability. However, a load on the processing of detecting the target desired by the user, which is performed to the search image, increases with increasing size of the search image. Therefore, it is desirable that the size of the search domain (search image) is properly set in consideration of the operability and the processing load.

The processing domain specifying part 25 acquires the detection result of the classifier for the search image from the classifier performing part 22, and specifies the processing domain having the largest number of hierarchies to which the detection processing can be performed by each of the weak classifiers. The processing domain specifying part 25 outputs the specified processing domain to the registration image generator 26.

As used herein, the processing domain having the largest number of hierarchies means a domain having the highest prospect of including the detection target of the classifier in the search image. That is, in the search image, the processing domain specifying part 25 specifies the domain having the highest prospect that the detection target of the classifier is included.

In the case where a plurality of processing domains having the largest number of hierarchies exist, the processing domain specifying part 25 specifies the processing domain having the highest index of the plurality of processing domains. In the case where a plurality of processing domains having the largest number of hierarchies exist, the processing domain specifying part 25 may output a domain in which the plurality of processing domains are integrated (superposed) to the registration image generator 26.

The registration image generator 26 acquires the domains specified by the processing domain specifying part 25 and the contour detector 27, extracts the acquired processing domain from the search image (or the photographed image) to generate a registration image. The registration image generator 26 outputs the generated registration image to the display controller 28.

The registration image generator 26 stores registration image information indicating the registration image to the storage 12.

In the case where the number of hierarchies of the processing domains specified by the processing domain specifying part 25 is less than or equal to a predetermined value, the registration image generator 26 does not perform the registration image generating processing based on the processing domain specified by the processing domain specifying part 25. At this point, the registration image generator 26 may notify the display controller 28 of an error, and the display controller 28 may display a message that the registration image generating processing is not normally performed on the display part 14.

At this point, in the case of the few number of hierarchies to which the weak classifier or each of the plurality of weak classifiers can perform the detection processing to a certain processing domain, it is considered that the processing domain has the low prospect of including the detection target of the classifier. Therefore, in the case where the highest number of hierarchies to which the weak classifier or each of the plurality of weak classifiers can perform the processing is less than or equal to the predetermined value as a result that the classifier performs the processing to the search image, although the processing domain having the highest number of hierarchies is considered to be the domain having the highest prospect of including the detection target of the classifier in the search image, reliability is low. Therefore, in the case where the number of hierarchies of the processing domains specified by the processing domain specifying part 25 is less than or equal to the predetermined value, the registration image generator 26 can exclude the low-reliability registration image by not performing the registration image generating processing.

The contour detector 27 acquires the search image from the search image generator 24, detects a contour from the acquired search image, and specifies the domain closed by the detected contour. The contour detector 27 outputs the specified domain to the registration image generator 26.

The display controller 28 acquires the photographed image from the image acquisition part 21, and displays the photographed image on the display part 14. The display controller 28 also acquires the detection result from the classifier performing part 22, and displays a marker indicating the position of the output domain on the image while overlapping the marker with the photographed image. The display controller 28 also acquires the registration image from the registration image generator 26, and displays the acquired registration image on the display part 14.

A program and data, which are referred to by the controller 11, are stored in the storage 12. For example, classifier information 31 and registration image information 32 are stored in the storage 12.

The classifier information 31 is used to generate the classifier that detects a predetermined target.

For example, the classifier information 31 indicates the number of weak classifiers constituting the classifier, the sequence of the weak classifiers, and the feature quantity, the reference range, and the like, which are used by the weak classifier.

Registration Image Generating Processing

Example 1

Figure 6:
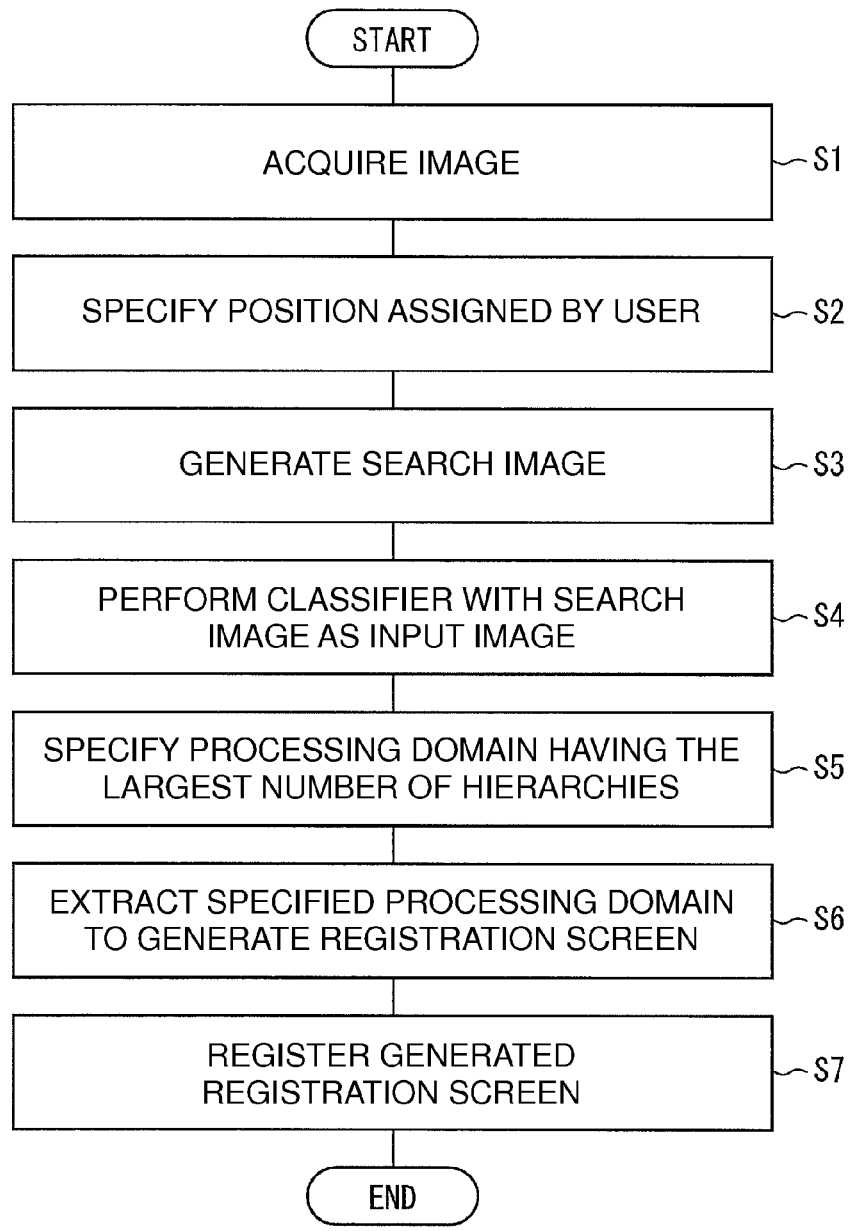
FIG. 6 is a flowchart illustrating registration image generating processing performed by the image processor.
Figure 7:
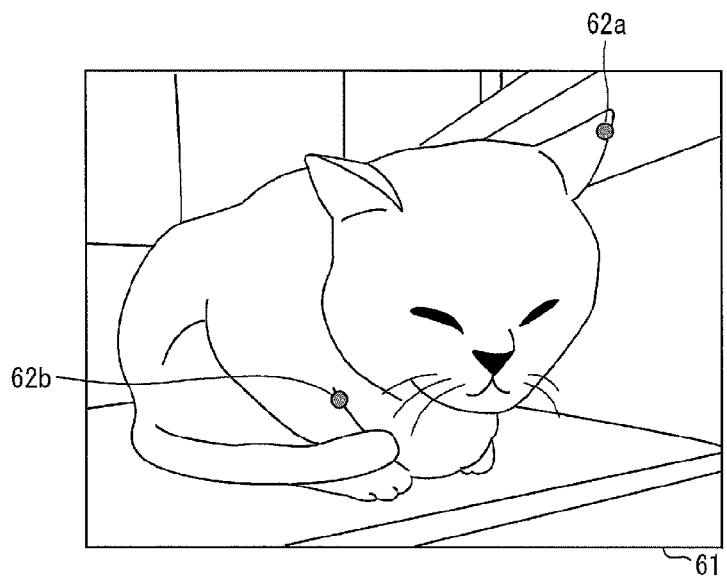
FIG. 7 is a view illustrating an assigned position assigned on a photographed image by a user in the registration image generating processing.
Figure 8:
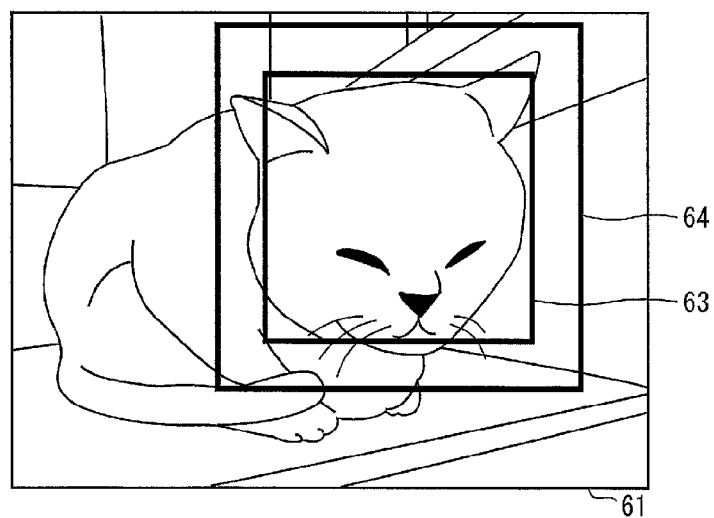
FIG. 8 is a view illustrating the assigned domain and a search domain on the photographed image in the registration image generating processing.
Figure 9:
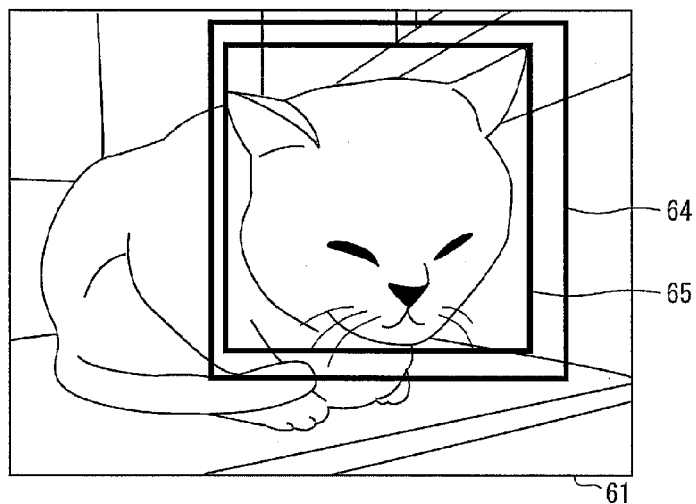
FIG. 9 is a view illustrating the search domain and a processing domain having the largest number of hierarchies on the photographed image in the registration image generating processing.
Figure 10:
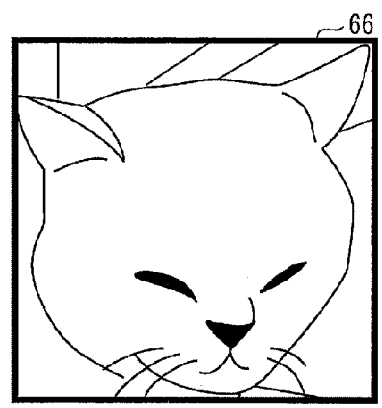
FIG. 10 is a view illustrating a registration image generated through the registration image generating processing.

An example (Example 1) of the registration image generating processing performed by the image processor 1 will be described below with reference to FIGS. 6 to 10. FIG. 6 is a flowchart illustrating the registration image generating processing performed by the image processor 1. FIG. 7 is a view illustrating the assigned position, which is assigned on the photographed image by the user. FIG. 8 is a view illustrating the assigned domain and the search domain on the photographed image. FIG. 9 is a view illustrating the search domain and the processing domain having the largest number of hierarchies on the photographed image. FIG. 10 is a view illustrating the registration image.

Here, it is assumed that the user registers a "cat face" because the "cat face" is not detected although the image processor 1 performs the detection processing to the photographed image using the classifier. It is assumed that the image processor 1 previously learns (a class of) the target to be registered by the user. Further, it is assumed that the user assigns two points on the photographed image and assigns the rectangular domain in which the two points are located at diagonal points on the photographed image.

The image acquisition part 21 acquires the photographed image from the camera 13 (S1). As described above, the "cat face" is not detected as a result of performing the detection processing using the classifier. Therefore, as illustrated in FIG. 7, the user manipulates the manipulation part 15 to assign two points (62a and 62b) on the photographed image 61. Based on the user instruction inputted to the manipulation part 15, the assigned position specifying part 23 specifies the assigned positions 62a and 62b on the photographed image 61 acquired from the image acquisition part 21 (S2). The assigned position specifying part 23 outputs the assigned positions 62a and 62b on the photographed image 61, which are assigned by the user, to the search image generator 24.

As illustrated in FIG. 8, the search image generator 24 acquires the assigned positions 62a and 62b from the assigned position specifying part 23, and specifies a rectangular domain 63 in which the assigned positions 62a and 62b are located at the diagonal positions as the assigned domain. The search image generator 24 specifies a predetermined search domain 64. The center of the search domain 64 is located in the same position as the assigned domain 63, and the search domain 64 has the size larger than (the range wider than) that of the assigned domain 63. The search image generator 24 extracts the specified search domain 64 from the photographed image to generate the search image (S3). The search image generator 24 outputs the generated search image to the classifier performing part 22.

When acquiring the search image from the search image generator 24, the classifier performing part 22 inputs the acquired search image as the input image to the classifier, and causes the classifier to perform the detection processing (S4). At this point, because the user registers the "cat face", it is assumed that a face classifier that detects a "face" of a human or a pet is performed. Because the face classifier cannot detect the "cat face", the face classifier outputs the number of hierarchies in each processing domain to the processing domain specifying part 25.

The processing domain specifying part 25 acquires the detection result of the face classifier for the search image from the classifier performing part 22, and specifies a processing domain 65 having the largest number of hierarchies which the detection processing can be performed by the weak classifiers as illustrated in FIG. 9 (S5). The processing domain specifying part 25 outputs the specified processing domain 65 to the registration image generator 26.

The registration image generator 26 acquires the processing domain 65 specified by the processing domain specifying part 25, and extracts the acquired processing domain 65 from the photographed image 61 to generate a registration image 66 as illustrated in FIG. 10 (S6). The registration image generator 26 stores the registration image information indicating the generated registration image 66 in the storage 12 to register the registration image (S7).

Thus, the image processor 1 sets the domain, which has the highest certainty of the "face" in the search domain larger than the assigned domain by the user, to the registration image. As illustrated in FIG. 8, even if the whole "cat face" that is the target desired by the user is not included in the assigned domain assigned by the user, the image including the whole "cat face" that is the target desired by the user can be registered without complicating the manipulation.

The registration image generated by the registration image generator 26 may be outputted to the display controller 28 after the registration image is generated in S6. At this point, the display controller 28 displays the registration image to present the registration image generated by the registration image generator 26 to the user. After the user performs the manipulation to register the registration image, the registration image generator 26 may store the registration image information indicating the generated registration image 66 in the storage 12 to register the registration image. On the other hand, in the case where the user views the displayed registration image to cancel the registration, the pieces of processing from S2 may be performed again.

Example 2

Figure 11:
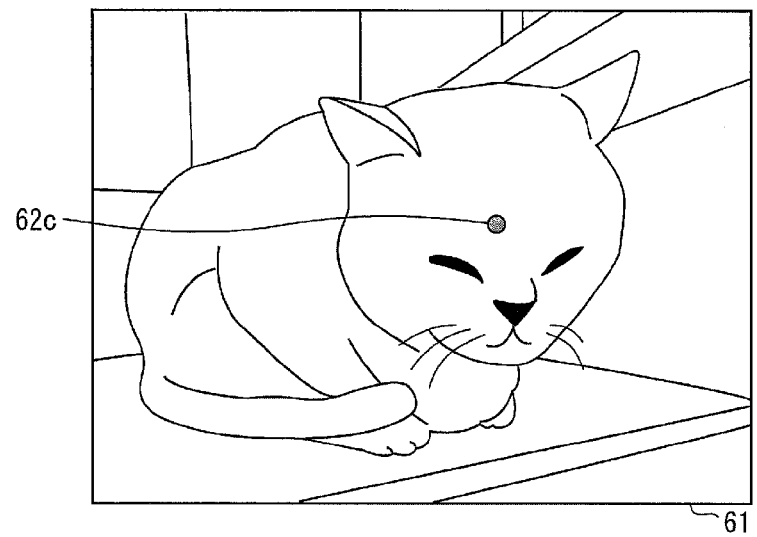
FIG. 11 is a view illustrating the assigned position assigned on the photographed image by the user in the registration image generating processing.
Figure 12:
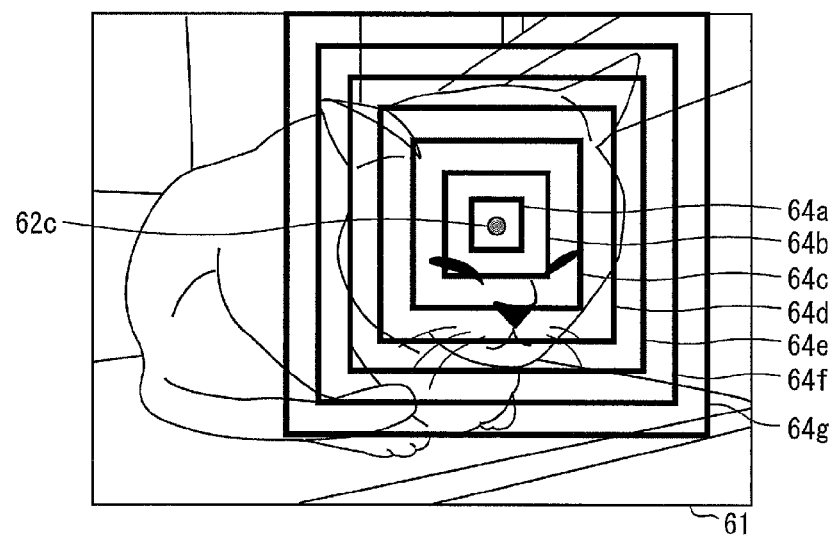
FIG. 12 is a view illustrating the search domain on the photographed image in the registration image generating processing.

Another example (Example 2) of the registration image generating processing of generating the registered image performed by the image processor 1 will be described below with reference to FIGS. 6, 11, and 12. FIG. 11 is a view illustrating the assigned position, which is assigned on the photographed image by the user. FIG. 12 is a view illustrating the search domain on the photographed image.

Example 2 is a modification of Example 1. As illustrated in FIG. 11, in Example 2, the user inputs only one point. Processing different from that of Example 1 will mainly be described.

Specifically, in S2, the assigned position specifying part 23 specifies an assigned position 62c on the photographed image 61 acquired from the image acquisition part 21 based on the user instruction inputted to the manipulation part 15.

In S3, as illustrated in FIG. 12, the search image generator 24 acquires the assigned position 62c from the assigned position specifying part 23, and specifies seven rectangular search domains 64a to 64g, which are different from each other in size. The assigned position 62c is located in the center of the seven rectangular search domains 64a to 64g. The search image generator 24 extracts the specified seven search domains 64a to 64g from the photographed image to generate seven search images. The search image generator 24 outputs the generated seven search images to the classifier performing part 22.

In S4, when acquiring the seven search images from the search image generator 24, the classifier performing part 22 inputs the acquired seven search images as the input image to the face classifier, respectively, and causes the face classifier to perform the detection processing. Because the face classifier cannot detect the "cat face", the face classifier outputs the number of hierarchies in each processing domain to the processing domain specifying part 25.

The pieces of processing in S5 to S7 are similarly performed to register the registration image. In S4, for each search image, the weak classifier of the classifier may set part of the search image to the processing domain or set the whole search image to the processing domain. In this case, because any one of search images is the registration image, the registration image can more properly be generated with increasing number of search images.

Example 3

Figure 13:
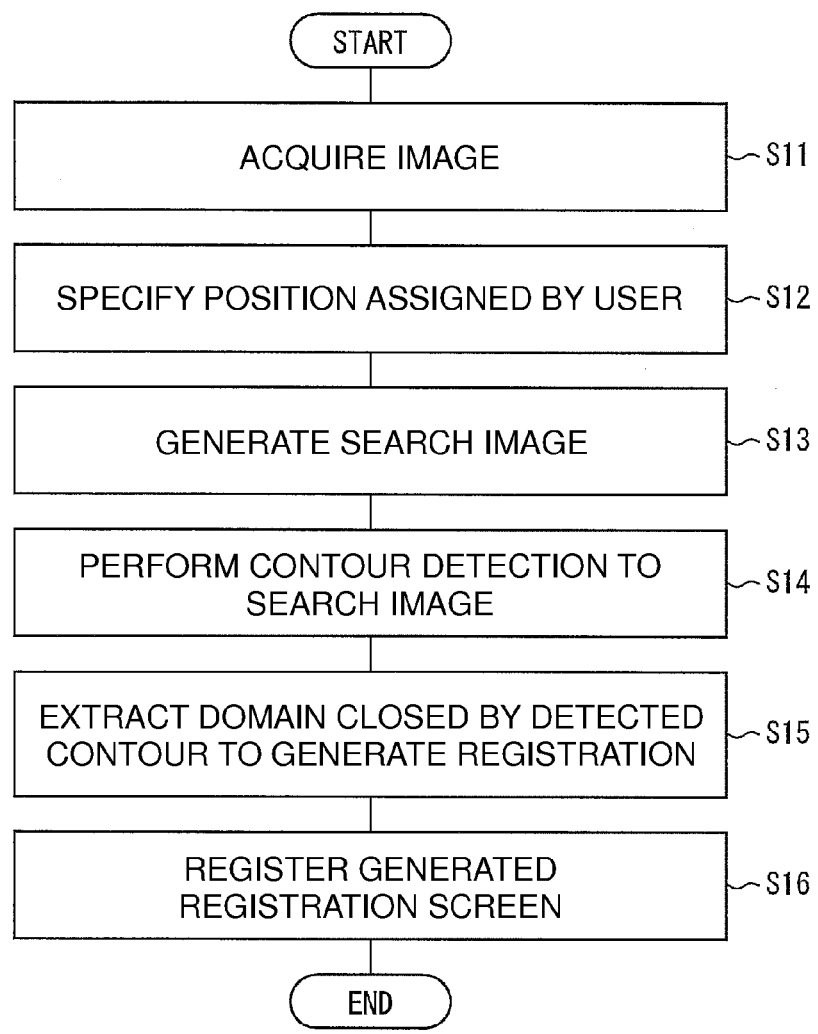
FIG. 13 is a flowchart illustrating an example of registration image generating processing performed by the image processor.
Figure 14:
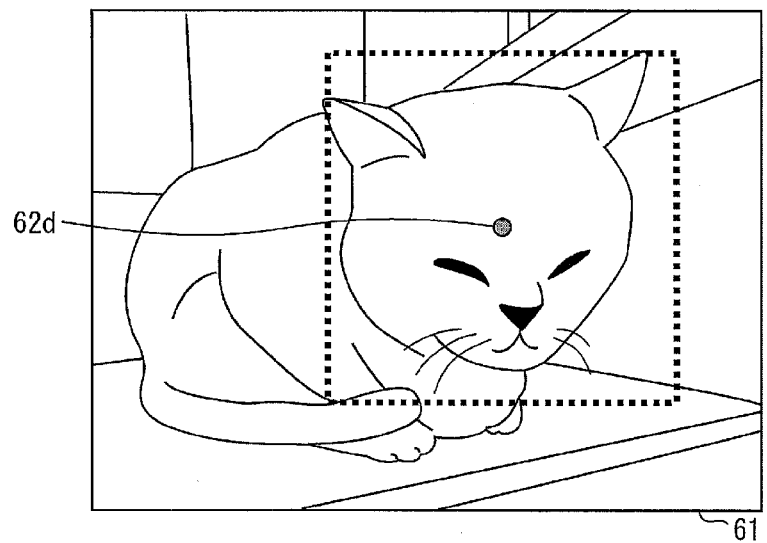
FIG. 14 is a view illustrating the assigned position assigned on the photographed image by a user in the registration image generating processing.
Figure 15:
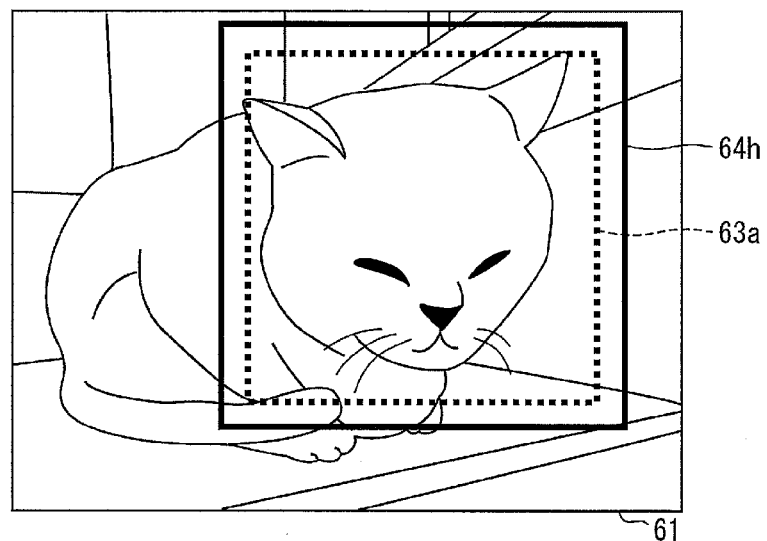
FIG. 15 is a view illustrating the assigned domain and the search domain on the photographed image in the registration image generating processing.
Figure 16:
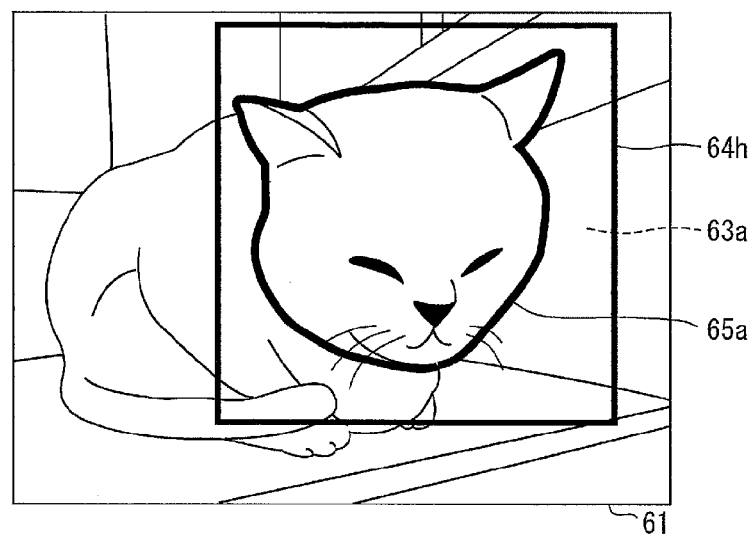
FIG. 16 is a view illustrating the search domain and a domain closed by a detected contour on the photographed image in the registration image generating processing.

Still another example (Example 3) of the registration image generating processing of generating the registered image performed by the image processor 1 will be described below with reference to FIGS. 13 to 16. FIG. 13 is a flowchart illustrating the registration image generating processing of generating the registered image performed by the image processor 1. FIG. 14 is a view illustrating the assigned position, which is assigned on the photographed image by the user. FIG. 15 is a view illustrating the assigned domain and the search domain on the photographed image. FIG. 16 is a view illustrating the search domain and the domain closed by the detected contour on the photographed image.

Example 3 differs from Example 1 in that contour detection processing is performed to the search image to generate the registration image. At this point, it is also assumed that the user registers the "cat face" because the "cat face" is not detected although the image processor 1 performs the detection processing to the photographed image using the owned classifier. Furthermore, it is assumed that the image processor 1 previously learns (the class of) the target to be registered by the user. It is assumed that the user assigns the center of a rectangular domain having a predetermined size and assigns the position of the domain on the photographed image.

As illustrated in FIG. 13, the image acquisition part 21 acquires the photographed image from the camera 13 (S11). As described above, the "cat face" is not detected as a result of performing the detection processing using the classifier. Therefore, as illustrated in FIG. 14, the user manipulates the manipulation part 15 to assign one point (62d) on the photographed image 61. Based on the user instruction inputted to the manipulation part 15, the assigned position specifying part 23 specifies the assigned position 62d on the photographed image 61 acquired from the image acquisition part 21 (S12). The assigned position specifying part 23 outputs the assigned position 62d on the photographed image 61, which is assigned by the user, to the search image generator 24.

As illustrated in FIG. 15, the search image generator 24 acquires the assigned position 62d from the assigned position specifying part 23, and specifies a predetermined sized rectangular domain 63a in which the assigned position 62d is located in the center as the assigned domain. The search image generator 24 specifies a predetermined search domain 64h. The center of the search domain 64h is located in the same position as the assigned domain 63a, and the search domain 64h has the size larger than (the range wider than) that of the assigned domain 63a. The search image generator 24 extracts the specified search domain 64h from the photographed image to generate the search image (S13). The search image generator 24 outputs the generated search image to the contour detector 27.

As illustrated in FIG. 16, the contour detector 27 acquires the search image from the search image generator 24, detects the contour from the acquired search image, and specifies a domain 65a closed by the detected contour (S14). The contour detector 27 outputs the specified domain 65a to the registration image generator 26.

The registration image generator 26 acquires the domain 65a specified by the contour detector 27, extracts the acquired domain 65a from the photographed image 61 to generate the registration image (S15). The registration image generator 26 stores the registration image information indicating the generated registration image in the storage 12, and registers the registration image (S16).

(Supplements)

The present invention is not limited to the embodiment described above, but various changes and modifications can be made without departing from the scope of the invention. That is, the present invention also includes the embodiment obtained by combining technical means, which are properly changed without departing from the scope of the present invention.

Finally, each block of the image processor 1, particularly the controller 11 may be constructed by a hardware logic, or by software using a CPU (Central Processing Unit) as will be described below.

That is, the image processor 1 includes the CPU that executes a command of a control program implementing each function, a ROM (Read Only Memory) in which the control program is stored, a RAM (Random Access Memory) in which the control program is expanded, and a storage device (recording medium), such as a memory, in which the control program and various pieces of data are stored. The object of the present invention can also be achieved such that the recording medium in which a program code (an executable format program, an intermediate code program, a source program) of the control program for the image processor 1, which is the software implementing the above functions, is stored while being readable by a computer is supplied to the image processor 1, and such that the computer (or the CPU or an MPU (Micro Processing Unit)) reads and executes the program code recorded in the recording medium.

Examples of the recording medium include tape systems, such as magnetic tape and cassette tape, disk systems including magnetic disks, such as floppy disk (registered trademark) and a hard disk, and optical disks, such as a CD-ROM, an MO an MD, a DVD, and a CD-R, card systems, such as an IC card (including a memory card) and an optical card, and semiconductor memory systems, such as a mask ROM, an EPROM, an EEPROM and a flash ROM.

The image processor 1 is configured to be connectable to a communication network, and the program code may be supplied through the communication network. There is no particular limitation to the communication network. Examples of the communication network include the Internet, an intranet, an extranet, a LAN, an ISDN, a VAN, a CATV communication network, a virtual private network, a telephone line network, a mobile communication network, and a satellite communication network. There is no particular limitation to a transmission medium constituting the communication network. Examples of the transmission medium include wired lines, such as IEEE 1394, a USB, a power-line carrier, a cable TV line, a telephone line, and an ADSL line, and wireless lines, such as infrared rays, such as IrDA and a remote controller, Bluetooth (registered trademark), 802.11 wireless, HDR, a mobile telephone network, a satellite line, and a terrestrial digital network. It is to be noted that the present invention can also be implemented in the form of a computer data signal embedded in a carrier wave. In this case, the program code is embodied by electronic transmission.

The present invention can be applied to the image processor that detects a predetermined material object on the image.

What is claimed is:

1. An image processor comprising:
    a classifier configured to detect a predetermined target from an image, the classifier including a plurality of weak classifiers in which a next-stage weak classifier is configured to perform detection processing to a preceding-stage output domain to output an output domain;
    an image acquisition part configured to acquire a photographed image photographed by a camera;
    an assigned position specifying part configured to specify a position assigned by a user on the photographed image;
    a search image generator configured to extract a domain near a position assigned by the assigned position specifying part from the photographed image and generate a search image;
    a classifier performing part configured to cause the classifier to perform detection processing to the search image generated by the search image generator;
    a processing domain specifying part configured to, based on a detection result of the detection processing, specify a processing domain having the largest number of hierarchies to which the detection processing can be performed by each of the plurality of weak classifiers; and
    a registration image generator configured to extract the processing domain specified by the processing domain specifying part from the photographed image and generate a registration image.

2. The image processor according to claim 1, wherein the search image generator is configured to specify a domain on the photographed image near the position assigned by the assigned position specifying part, and the search image generator is configured to extract a domain larger than the specified domain from the photographed image and generate the search image.

3. The image processor according to claim 1, wherein the search image generator is configured to specify a plurality of domains having different sizes, the position assigned by the assigned position specifying part being located in the center in the plurality of domains, and the search image generator being configured to extract each of the plurality of domains specified by the search image generator from the photographed image, and to generate a plurality of search images.

4. The image processor according to claim 1, wherein, for a plurality of processing domains having the largest number of hierarchies to which the detection processing can be performed by each of the plurality of weak classifiers, the processing domain specifying part is configured to specify the processing domain having the highest index indicating superiority of the detection result.

5. The image processor according to claim 1, wherein, for a plurality of processing domains having the largest number of hierarchies to which the detection processing can be performed by each of the plurality of weak classifiers, the processing domain specifying part is configured to specify a domain in which the plurality of processing domains are integrated.

6. The image processor according to claim 1, wherein the registration image generator is configured to not perform registration image generating processing based on the processing domain specified by the processing domain specifying part when the number of hierarchies of the processing domains specified by the processing domain specifying part is less than or equal to a predetermined value.

7. An image processing method for an image processor including a classifier configured to detect a predetermined target from an image, the classifier including a plurality of weak classifiers in each of which a next-stage weak classifier is configured to perform detection processing to a preceding-stage output domain to output an output domain, the image processing method comprising the steps of:
    acquiring a photographed image photographed by a camera;
    specifying a position assigned by a user on the photographed image;
    extracting a domain near a position assigned in the assigned position specifying step from the photographed image and generating a search image;

causing the classifier to perform detection processing to the search image generated in the search image generating step;

specifying a processing domain having the largest number of hierarchies to which the detection processing can be performed by each of the plurality of weak classifiers based on a detection result in the classifier performing step; and extracting the processing domain specified in the processing domain specifying step from the photographed image and generating a registration image.

8. A non-transitory computer-readable recording medium in which a control program that causes a computer to act as the image processor of claim 1 is recorded.

* * * * *